United States Patent
Kinomura

(10) Patent No.: US 12,122,246 B2
(45) Date of Patent: *Oct. 22, 2024

(54) SERVER, VEHICLE, AND POWER MANAGEMENT METHOD

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

This patent is subject to a terminal disclaimer.

(21) Appl. No.: 17/689,325

(22) Filed: Mar. 8, 2022

(65) Prior Publication Data

US 2022/0289041 A1 Sep. 15, 2022

(30) Foreign Application Priority Data

Mar. 15, 2021 (JP) .................... 2021-041174

(51) Int. Cl.
*B60L 15/20* (2006.01)
*B60L 58/12* (2019.01)
*G07C 5/00* (2006.01)

(52) U.S. Cl.
CPC ............ *B60L 15/20* (2013.01); *B60L 58/12* (2019.02); *G07C 5/004* (2013.01); *B60L 2240/54* (2013.01)

(58) Field of Classification Search
CPC ........ B60L 15/20; B60L 8/00; B60L 2250/16; B60L 53/00; B60L 53/10; B60L 53/305;
(Continued)

(56) References Cited

U.S. PATENT DOCUMENTS 5,815,824 A * 9/1998 Saga ..................... B60W 20/00
180/65.245
2010/0102776 A1 4/2010 Uchida
(Continued)

FOREIGN PATENT DOCUMENTS

JP 2009184636 A * 8/2009
JP 2009-262692 A 11/2009
(Continued)

OTHER PUBLICATIONS

English translation of JP 2009184636 (Year: 2009).*
(Continued)

*Primary Examiner* — Russell Frejd
*Assistant Examiner* — Brandon Z Willis
(74) *Attorney, Agent, or Firm* — Finnegan, Henderson, Farabow, Garrett and Dunner, LLP

(57) ABSTRACT

A vehicle includes a battery to which electric power supplied from electric vehicle supply equipment is charged. A green zone exists in which traveling of a vehicle using an amount of electric power that has a greenhouse gas emission intensity greater than a regulatory limit is restricted. A server includes: I/O ports through which the emission intensity of the electric power supplied from the electric vehicle supply equipment is obtained; and a processor that associates the amount of electric power charged from the electric vehicle supply equipment to the battery with the emission intensity obtained through the I/O ports. The processor: permits the vehicle to travel within the green zone using an amount of electric power having an emission intensity less than the regulatory limit within the amount of electric power stored in the battery; and notifies the vehicle of information related to that amount of electric power.

11 Claims, 13 Drawing Sheets

(58) Field of Classification Search
CPC .......... B60L 53/14; B60L 53/50; B60L 53/66;
B60L 53/665; B60L 53/68; B60L 58/12;
B60L 58/13; B60L 58/10; B60L 2240/42;
B60L 2240/54; B60L 2240/70; B60L
2240/72; B60L 2240/622; B60L 2260/52;
B60L 2260/54; B60L 2270/10; B60L
2270/12; Y02T 10/70; Y02T 10/80; Y02T
10/84; Y02T 90/10; Y02T 90/12; Y02T
90/16; Y02T 90/167; H02J 3/322; H02J
2310/14; G06Q 10/04; G06Q 10/06315;
G06Q 30/0283; G06Q 50/06; G06Q
50/26; G06Q 50/40; G07C 5/004; G08G
1/207; B60W 60/0023

See application file for complete search history.

(56) References Cited

U.S. PATENT DOCUMENTS

| | | | |
|---|---|---|---|
| 2011/0144921 A1* | 6/2011 | Ishibashi | H02J 3/32 |
| | | | 702/24 |
| 2013/0096725 A1* | 4/2013 | Ishida | B60L 53/52 |
| | | | 700/286 |
| 2016/0164313 A1 | 6/2016 | Ohta et al. | |
| 2019/0135070 A1 | 5/2019 | Lee | |
| 2020/0111175 A1* | 4/2020 | Uyeki | B60L 53/67 |
| 2021/0180970 A1* | 6/2021 | Park | B60L 58/13 |
| 2022/0292951 A1 | 9/2022 | Kinomura | |

FOREIGN PATENT DOCUMENTS

| | | | | |
|---|---|---|---|---|
| JP | 2010239704 A | * | 10/2010 | |
| JP | 2011-191909 A | | 9/2011 | |
| JP | 2012-016185 A | | 1/2012 | |
| JP | 2013025432 A | * | 2/2013 | |
| JP | 6156499 B2 | | 7/2017 | |
| JP | 2017-178075 A | | 10/2017 | |
| JP | 2019-085094 A | | 6/2019 | |
| JP | 2020-086911 A | | 6/2020 | |
| WO | WO 2007/066198 A2 | | 6/2007 | |
| WO | WO-2011132054 A2 | * | 10/2011 | .......... B60L 11/1809 |

OTHER PUBLICATIONS

English translation of JP 2010239704 (Year: 2010).*
English translation of JP 2013025432 (Year: 2013).*
Office Action issued in U.S. Appl. No. 17/689,442 on Mar. 15, 2023.
Notice of Allowance dated May 24, 2023, issued in U.S. Appl. No. 17/689,442.

* cited by examiner $E1 < E3 < Ereg < E2 < E4$

AMOUNT OF CLEAN ELECTRIC POWER

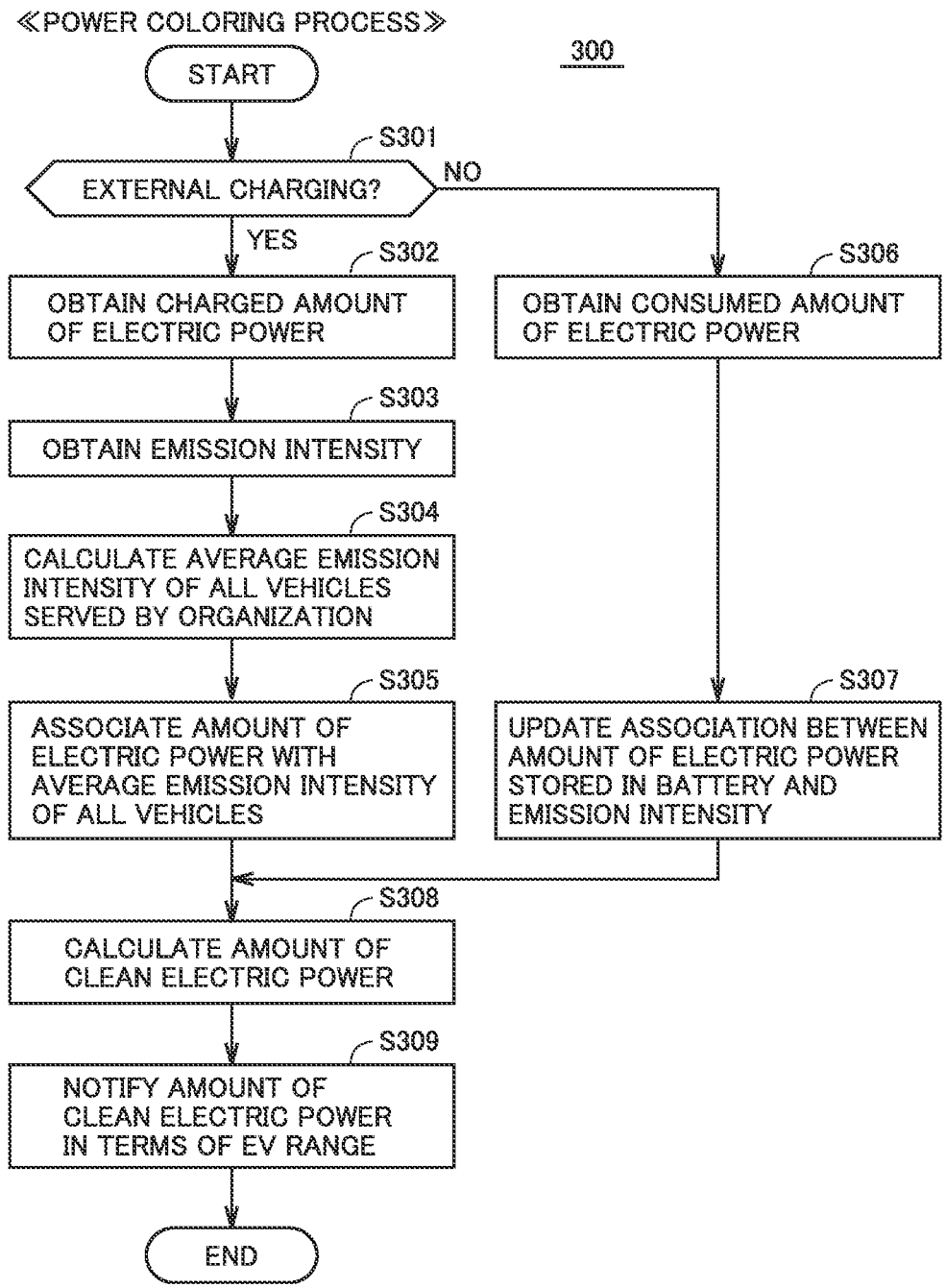

SERVER, VEHICLE, AND POWER MANAGEMENT METHOD

This nonprovisional application is based on Japanese Patent Application No. 2021-041174 filed on Mar. 15, 2021 with the Japan Patent Office, the entire content of which is hereby incorporated by reference.

BACKGROUND

Field

The present disclosure relates to a server, a vehicle, and a power management method, and, more particularly, to a technique for managing electric power information of a vehicle.

Description of the Background Art

The amount of electric power stored in the traction battery of a vehicle include those derived from various power generation modes, such as thermal power generation, nuclear power generation, hydroelectric power generation, solar power generation, etc. A management approach is known for differentiating the amounts of electric power stored in a battery by power generation mode (or by amount of greenhouse gas produced upon generation of power) (e.g., see Japanese Patent Laying-Open No. 2020-86911).

An area may be set by laws and regulations or policies where reduction in emission of the exhaust gas is demanded or emission of the exhaust gas is not permitted. Such an area is called "green zone" or "zero emission vehicle (ZEV) zone" (e.g., see Japanese Patent Laying-Open No. 2019-85094). A technology, called "geofence," is also known, which is a virtual boundary for a specific zone, such as a green zone or a ZEV zone, using GPS (Global Positioning System) and wireless communication technologies.

SUMMARY

At present, it is common that a vehicle is permitted to travel within the green zone if the vehicle travels in an electric vehicle (EV) mode (electric power-consuming traveling, without driving the engine). However, the present inventors have focused on a fact that the following problem can occur in the future.

In the future, electric vehicles and plug-in hybrid vehicles are expected to be widely used. In contrast, a respective country may further raise the set goal for the reduction of greenhouse gas emission. To this end, as a condition for permitting the vehicle to travel within the green zone, the vehicle may be asked how much greenhouse gas the vehicle produces when generating the amount of electric power stored in the battery. As a result, whether the vehicle should be permitted to travel in the green zone cannot be determined just by determining whether the vehicle can travel in the EV mode.

The present disclosure is made in view of the problem above, and an object of the present disclosure is to appropriately determine whether a vehicle should be permitted to travel within a zone that is restricted with respect to the amount of production of greenhouse gas involved in generation of power used by the vehicle.

(1) A server according to a first aspect of the present disclosure manages electric power information of a vehicle. The vehicle includes a power storage device that is charged with electric power supplied from a charging facility. A travel restriction zone exists in which traveling using an amount of electric power having a greenhouse gas emission intensity greater than a regulatory limit is restricted. The server includes: an interface that obtains the emission intensity of electric power supplied from the charging facility; and a processor that associates the amount of electric power charged from the charging facility to the power storage device with the emission intensity obtained via the interface. The processor permits the vehicle to travel within the travel restriction zone using an amount of electric power having the emission intensity less than the regulatory limit within the amount of electric power stored in the power storage device, and notifies the vehicle of information related to that amount of electric power.

In the configuration (1) above, the processor associates the amount of electric power charged from the charging facility to the power storage device with the emission intensity (power coloring). This allows the server to know how much electric power (clean electric power) having the emission intensity less than the regulatory limit is within the amount of electric power stored in the power storage device. Thus, according to the configuration (1) above, whether the vehicle should be permitted to travel within the travel restriction zone can be appropriately determined.

(2) The processor differentiates association between the amount of electric power charged from the charging facility to the power storage device and the emission intensity for each charging opportunity of the power storage device. The processor notifies the vehicle of information related to a sum of the amount of electric power having the emission intensity less than the regulatory limit.

(3) The processor differentiates the amount of electric power charged from the charging facility to the power storage device based on whether the emission intensity is greater than the regulatory limit or less than the regulatory limit. The processor notifies the vehicle of information related to the amount of electric power having the emission intensity less than the regulatory limit.

In the configurations (2) and (3) above, the association is differentiated by charging opportunity or by comparison of the emission intensity to the regulatory limit. This allows better management as to how much electric power having the emission intensity less than the regulatory limit is within the amount of electric power stored in the power storage device.

(4) The processor calculates an average, in a predetermined period, of the emission intensity associated with the amount of electric power charged from the charging facility to the power storage device. The processor notifies the vehicle of information related to the amount of electric power having the emission intensity whose average is less than the regulatory limit.

In the configuration (4) above, the average emission intensity in the predetermined period is associated with the amount of electric power. This can lower the average emission intensity if the emission intensity at a certain charging opportunity exceeds the regulatory limit, thereby lowering the average emission intensity less than the regulatory limit.

(5) A plurality of vehicles, including the vehicle, exist. The processor calculates an average of emission intensities associated with amounts of electric power charged from the charging facility to power storage devices of the vehicle and the plurality vehicles. The processor notifies the vehicle of information related to the amount of electric power having the emission intensity whose average is less than the regulatory limit.

In the configuration (5) above, the average emission intensity of the vehicles is associated with the amount of electric power. This can, if the emission intensities of the amounts of electric power charged to some vehicles exceed the regulatory limit, lower the average emission intensity by the emission intensities of the amounts of electric power charged to the remaining vehicles, thereby lowering the average emission intensity less than the regulatory limit.

(6) Prior to the vehicle traveling within the travel restriction zone, the processor notifies the vehicle of a distance that the vehicle can travel within the travel restriction zone, the distance being calculated based on the amount of electric power having the emission intensity less than the regulatory limit.

(7) When the vehicle is traveling within the travel restriction zone, the processor updates the distance that the vehicle can travel within the travel restriction zone and notifies the vehicle of the updated distance.

In the configurations (6) and (7) above, prior to the vehicle traveling within the travel restriction zone, or while the vehicle is traveling within the travel restriction zone, the vehicle is notified of a distance that the vehicle can travel within the travel restriction zone. This allows the vehicle notified of the distance can take an appropriate action, such as leaving the travel restriction zone before the distance decreases to zero.

(8) The processor further notifies an administrator of the travel restriction zone of information related to the amount of electric power having the emission intensity less than the regulatory limit.

According to the configuration (8) above, the administrator notified of the information can appropriately manage the travel restriction zone. For example, the administrator can police the vehicle if the vehicle is traveling within the travel restriction zone although the vehicle is not permitted to do so.

(9) A vehicle according to a second aspect of the present disclosure includes: a power storage device charged with electric power supplied from a charging facility; and a processor that performs information processing on an amount of electric power stored in the power storage device. A travel restriction zone exists in which traveling using an amount of electric power having a greenhouse gas emission intensity greater than a regulatory limit is restricted. Based on data related to the emission intensity obtained from the charging facility when the power storage device is charged, the processor associates the amount of electric power stored in the power storage device with the emission intensity. The processor uses, when the vehicle travels within the travel restriction zone, an amount of electric power having the emission intensity less than the regulatory limit within the amount of electric power stored in the power storage device.

According to the configuration (9) above, similar to the configuration (1) above, the vehicle can appropriately travel within the travel restriction zone, without violating the regulations.

(10) A power management method according to a third aspect of the present disclosure manages electric power information of a vehicle. The vehicle includes a power storage device that is charged with electric power supplied from a charging facility. A travel restriction zone exists in which traveling using an amount of electric power having a greenhouse gas emission intensity greater than regulatory limit is restricted. The power management method includes a first step, a second step, a third step, and a fourth step. The first step is obtaining the amount of electric power charged from the charging facility to the power storage device. The second step is obtaining the emission intensity of the electric power supplied from the charging facility. The third step is associating the amount of electric power charged from the charging facility to the power storage device with the emission intensity. The fourth step is permitting the vehicle to travel within the travel restriction zone using an amount of electric power having the emission intensity less than the regulatory limit within the amount of electric power stored in the power storage device, and notifying the vehicle of information related to that amount of electric power.

According to the method (10) above, whether the vehicle should be permitted to travel within the travel restriction zone can be appropriately determined, similarly to the configuration (1) above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 14 is a flowchart illustrating the power coloring process according to Embodiment 3.

DESCRIPTION OF THE PREFERRED EMBODIMENTS

Hereinafter, embodiments of the present disclosure will be now described in detail, with reference to the accompanying drawings. Note that the same reference sign is used to refer to the same or like parts, and the description thereof will not be repeated.

Embodiment 11

<Overall System Configuration>

Figure 1:
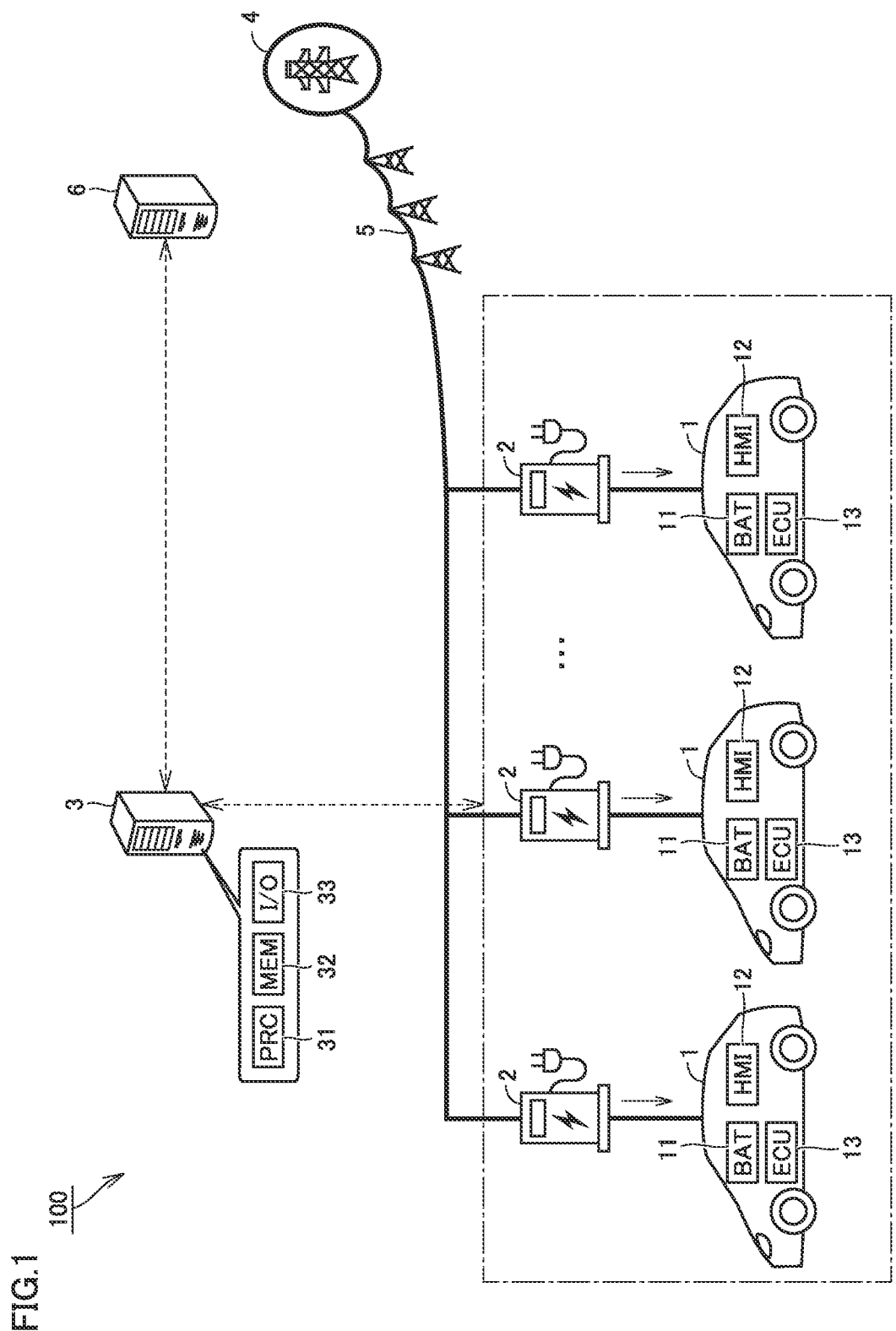
FIG. 1 is a schematic configuration of a power management system according to Embodiment 1 of the present disclosure.

FIG. 1 is a schematic configuration of a power management system according to Embodiment 1 of the present disclosure. A power management system 100 includes a vehicle 1; an electric vehicle supply equipment (EVSE) 2; a server 3; a power system 4; a power transmission line 5; and an operator server 6.

The vehicle 1 is an electric-powered vehicle, and, more specifically, is a battery electric vehicle (BEV), a plug-in hybrid electric vehicle (PHEV), etc. Hereinafter, for simplicity, assume that the vehicle 1 is a BEV. The vehicle 1 includes a battery 11, a human machine interface (HMI) 12, and an electronic control unit (ECU) 13.

The battery 11 is an assembled battery formed of multiple cells (not shown). Each cell is a secondary battery, such as a lithium-ion battery or a nickel-hydrogen battery. The battery 11 supplies an electric power for generating a driving force for the vehicle 1. The battery 11 also stores electric power that is generated by a motor generator (not shown) upon braking through a regenerative braking system of vehicle 1. Note that a capacitor, such as an electric double layer capacitor, can be employed, instead of the battery 11. The battery 11 corresponds to a "power storage device" according to the present disclosure.

The vehicle 1 has a configuration in which electric power supplied from the electric vehicle supply equipment 2 is charged to the battery 11 as a charging cable, extending from the electric vehicle supply equipment 2, is connected to an inlet (not shown) of the vehicle 1. Hereinafter, this mode of charging is also referred to as "external charging."

For example, the HMI 12 receives operations by a user (a driver), or provides the user with various information and data. The HMI 12 can include, for example, an instrument panel, the touch panel display (the navigation screen) of a navigation system, a head-up display (HUD), control buttons, or smart speakers. Note that the vehicle 1 and the server 3 are capable of two-way communications therebetween.

The ECU 13 includes a processor, such as a central processing unit (CPU), a memory, such as a read only memory (ROM) and a random access memory (RAM), and input/output ports. The ECU 13 executes various arithmetic processes for controlling the vehicle 1. The ECU 13 corresponds to a "controller" according to the present disclosure.

The electric vehicle supply equipment 2 is, for example, a public charging station or a home charger. The electric vehicle supply equipment 2 receives electric power from the power system 4 via the power transmission line 5, and supplies the electric power to the vehicle 1. The electric vehicle supply equipment 2 and the server 3 are also capable of two-way communications therebetween.

The server 3 is a computer which manages the vehicle 1 and the electric vehicle supply equipment 2 within the power management system 100. The server 3 includes a processor 31, a memory 32, and input/output ports 33. The processor 31 is, for example, a central processing unit (CPU), and executes the arithmetic processes written in programs. The memory 32 includes a memory storing the programs for execution by the processor 31, and stores various data (maps, relational expressions, parameters, etc.) that are used in the programs. The memory 32 also includes a database, and stores data related to electric power for the various devices within the power management system 100. The input/output ports 33 receive/output notifications, commands, requests, etc. from/to outside the server 3. The server 3 includes a communication module (not shown), and communicates external to the power management system 100 (such as the operator server 6), in addition to the vehicle 1 and the electric vehicle supply equipment 2.

Examples of main processes performed by the server 3 according to the present embodiment include "green zone management process" and "power coloring process." The green zone management process manages the vehicle 1 when entering the green zone and when traveling within the green zone. The power coloring process colors amounts of electric power stored in the battery 11. These processes will be described in detail later.

The power system 4 is a power network built by power plants and power transmission and distribution equipment (T&D) facilities. In the present embodiment, an electric power company serves as a power generation utility and a power T&D utility. The electric power company corresponds to a general power T&D utility and an administrator of the power system 4, and maintains and manages the power system 4.

The operator server 6 belongs to the power company. The operator server 6 is a computer which manages the demand and supply of electric power supplied from the power system 4. The operator server 6 has data as to how much greenhouse gas is produced at the power plant (the emission intensity). The operator server 6 is also capable of two-way communications with the server 3.

Note that the number of vehicles 1 and the electric vehicle supply equipment 2 included in the power management system 100 is not particularly limited. The example shown in FIG. 1 show multiple vehicles 1 and multiple electric vehicle supply equipment. However, only one vehicle 1 and one electric vehicle supply equipment 2 may be included.

<Green Zone>

Figure 2:
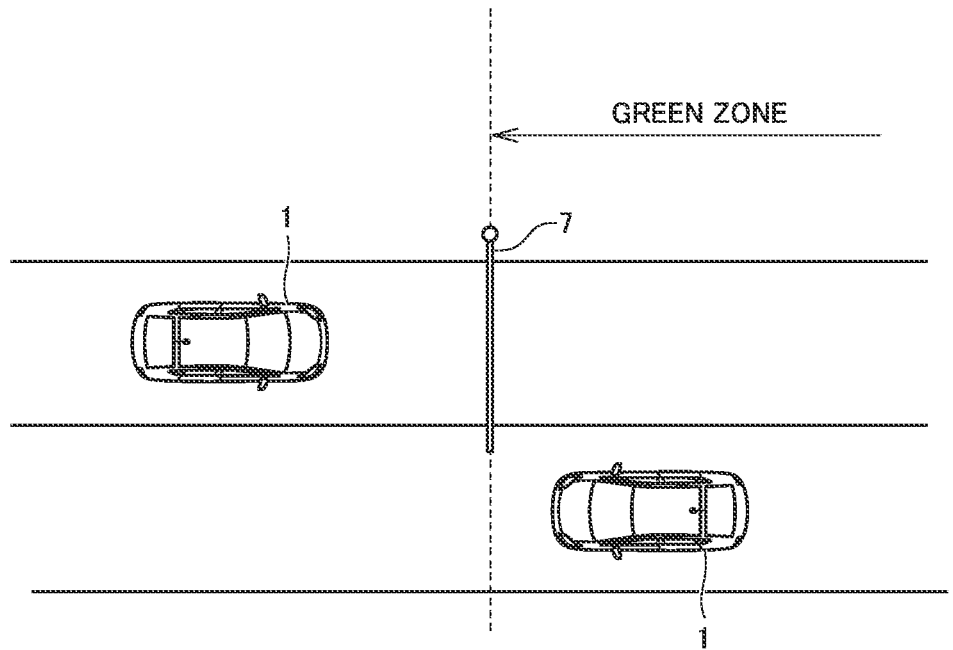
FIG. 2 is a diagram for illustrating one example of how a vehicle enters or leaves a green zone.

FIG. 2 is a diagram for illustrating one example of how the vehicle 1 enters or leaves a green zone. In the present embodiment, since emission of the exhaust gas is not permitted within the green zone, the vehicle 1 is requested to travel in the EV mode within the green zone. Note that the green zone corresponds to a "travel restriction zone" according to the present disclosure.

In the example shown in FIG. 2, a gate 7 is provided at the boundary between inner side and outer side of the green zone. As the vehicle 1 approaches the gate 7, the server 3 determines whether to permit the vehicle 1 to enter the green zone. If the vehicle 1 meets a predetermined condition (described later), the server 3 permits the vehicle 1 to enter the green zone, and opens the gate 7. In contrast, if the vehicle 1 fails to meet the condition above, the server 3 does not permit the vehicle 1 to enter the green zone, keeping the gate 7 closed.

However, the gate 7 provided at the boundary is merely by way of example for clarity. A geofence (a virtual boundary) may be set, instead of a physical gate. If the geofence is set, a vehicle failing to meet the condition above may be subjected to penalty (e.g., a fine) if the vehicle enters the green zone.

<Reduction of Greenhouse Gas Emission>

If electric power generated by burning a fossil fuel is charged to the battery 11, no greenhouse gas is produced while the vehicle 1 is traveling in the EV mode. However, a certain level of greenhouse gas is produced when considering through the course from the generation of electric power to the consumption thereof. Accordingly, just requesting the vehicle 1 to travel in the EV mode within the green zone does not contribute to reduction of greenhouse gas emission, which may result in failing to achieve a high goal for the reduction of greenhouse gas emission.

Thus, in the present embodiment, how much greenhouse gas is produced when the amount of electric power stored in the battery 11 is generated is considered as a condition for permitting the vehicle 1 to enter or travel within the green zone. More specifically, "emission intensity" (unit: g/kWh) which is greenhouse gas emission per unit of generated power is taken into account.

During the external charging of the vehicle 1, the server 3 obtains data related to the emission intensity from the power company, and associates the amount of electric power stored in the battery 11 with the emission intensity. Stated differently, the server 3 performs "power coloring process," in which the amount of electric power stored in the battery 11 is conceptually colored in accordance with the emission intensity. This enables the server 3 to quantitatively evaluate the amount of electric power stored in the battery 11 based on whether an amount of electric power is clean or not.

The server 3 permits the vehicle 1 to travel in the green zone, consuming the amount of clean electric power having an emission intensity less than the regulatory limit (described as Ereg). Hereinafter, for simplicity, this amount of electric power will also be referred to as an "amount of clean electric power." The server 3 does not permit the vehicle 1 to travel within the green zone any further if the amount of clean electric power is consumed and depleted along with the vehicle 1 traveling within the green zone. This process will be described in detail later.

<Power Coloring>

Figure 3:
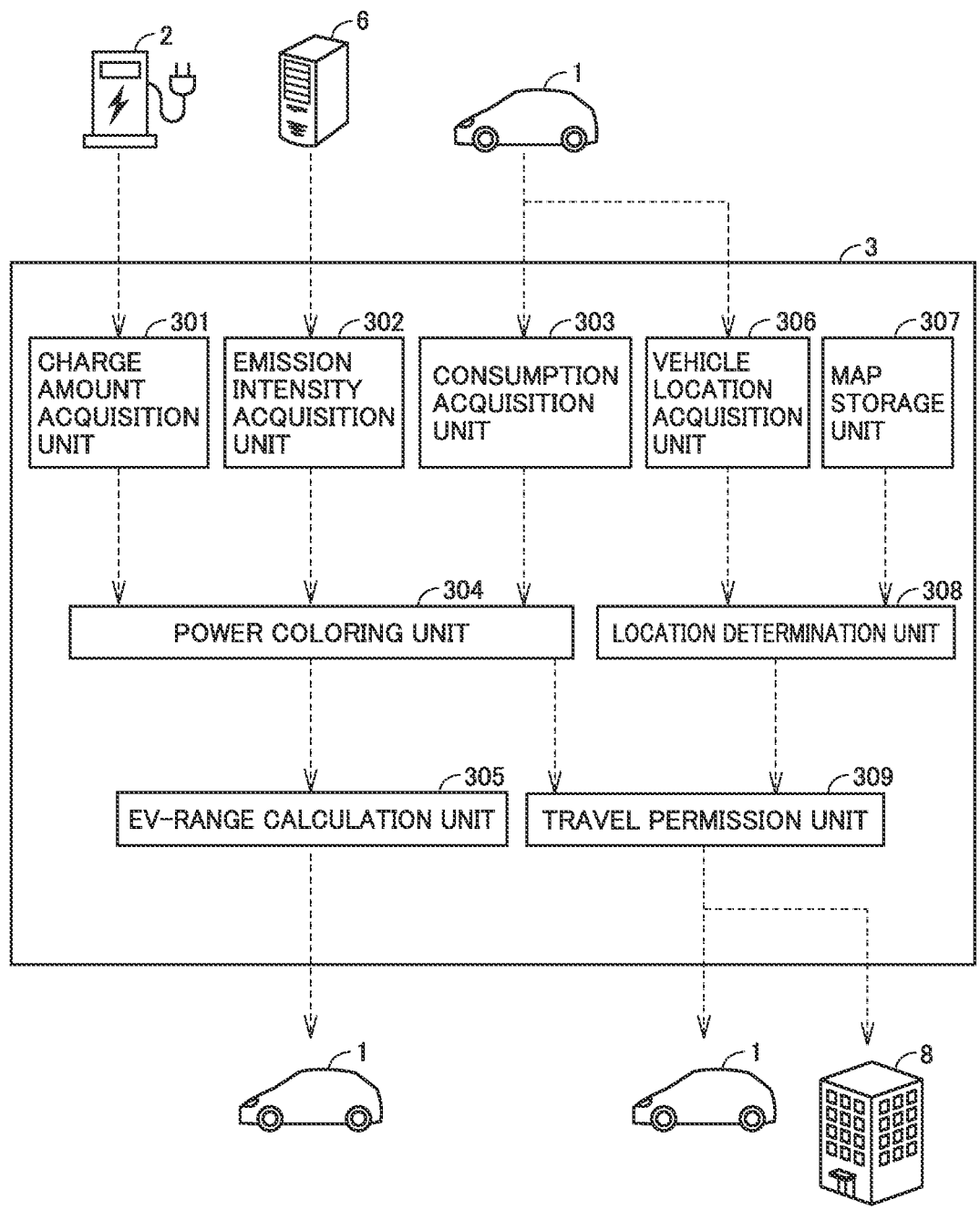
FIG. 3 is a functional block diagram of a server.

FIG. 3 is a functional block diagram of the server 3. The server 3 includes a charge amount acquisition unit 301, an emission intensity acquisition unit 302, a consumption acquisition unit 303, a power coloring unit 304, an EV-range calculation unit 305, a vehicle location acquisition unit 306, a map storage unit 307, a location determination unit 308, and a travel permission unit 309.

During the external charging of the vehicle 1, the charge amount acquisition unit 301 obtains the amount of electric power that is supplied from the electric vehicle supply equipment 2 to the vehicle 1 and charged to the battery 11. While the charge amount acquisition unit 301 can obtain the amount of electric power charged to the battery 11, through communications with the electric vehicle supply equipment 2, the charge amount acquisition unit 301 may obtain this from the vehicle 1. The obtained amount of electric power is output to the power coloring unit 304.

The emission intensity acquisition unit 302 obtains from the power company the emission intensity of the amount of electric power supplied from the electric vehicle supply equipment 2 to the vehicle 1.

Figure 4:
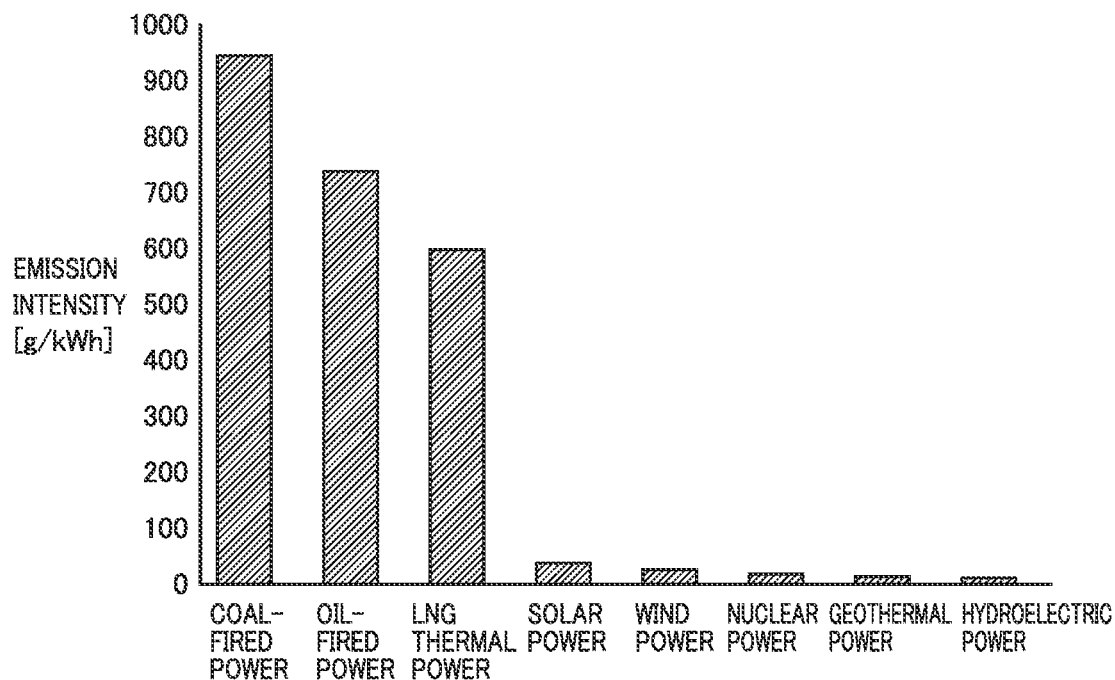
FIG. 4 is a diagram for illustrating emission intensity.

FIG. 4 is a diagram for illustrating the emission intensity. FIG. 4 shows representative emission intensities of thermal power generation, solar power generation, wind power generation, nuclear power generation, geothermal power generation, and hydroelectric power generation. One can see, from FIG. 4, that thermal power generation (coal-fired power generation, oil-fired power generation, and liquefied natural gas (LNG) thermal power generation) have greater emission intensities than the other power generation modes.

Returning to FIG. 3, regarding the electric power transmitted from the power system 4 to the electric vehicle supply equipment 2 via the power transmission line 5, the operator server 6 of the power company has the data related to the emission intensity of that electric power when generated. Accordingly, the emission intensity acquisition unit 302 can obtain from the operator server 6 the emission intensity of the amount of electric power supplied from the electric vehicle supply equipment 2 to the vehicle 1. The obtained emission intensity is output to the power coloring unit 304.

The consumption acquisition unit 303 obtains from the vehicle 1 the amount of electric power consumed (used) from the battery 11 while the vehicle 1 is traveling. The obtained amount of electric power is output to the power coloring unit 304.

Based on the amount of electric power charged to the battery 11 and the amount of electric power consumed from the battery 11, the power coloring unit 304 performs the power coloring process on the amount of electric power stored in the battery 11.

Figure 5:
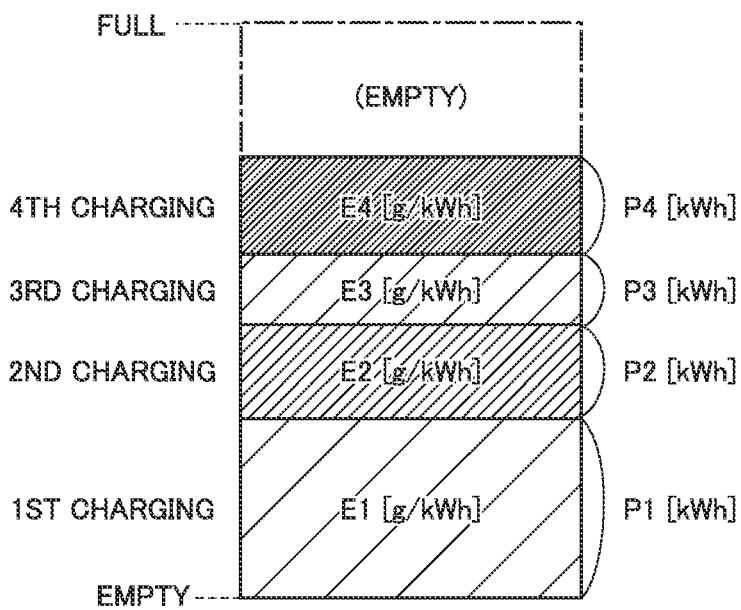
FIG. 5 is a conceptual diagram of a power coloring process.

FIG. 5 is a conceptual diagram of the power coloring process. The server 3 associates the amount of electric power charged to the battery 11 with its emission intensity when that electric power is generated. In Embodiment 1, the server 3 distinctly manages the association between the amount of electric power charged to the battery 11 and the emission intensity for each external charging opportunity.

FIG. 5 illustrates a result of the power coloring process when external charging is performed four times. For the first charging opportunity, the server 3 associates an amount of electric power P1 charged to the battery 11 with an emission intensity E1. For the second charging opportunity, the server 3 associates an amount of electric power P2 charged to the battery 11 with an emission intensity E2. The same applies to the third charging opportunity and the fourth charging opportunity.

Figure 6:
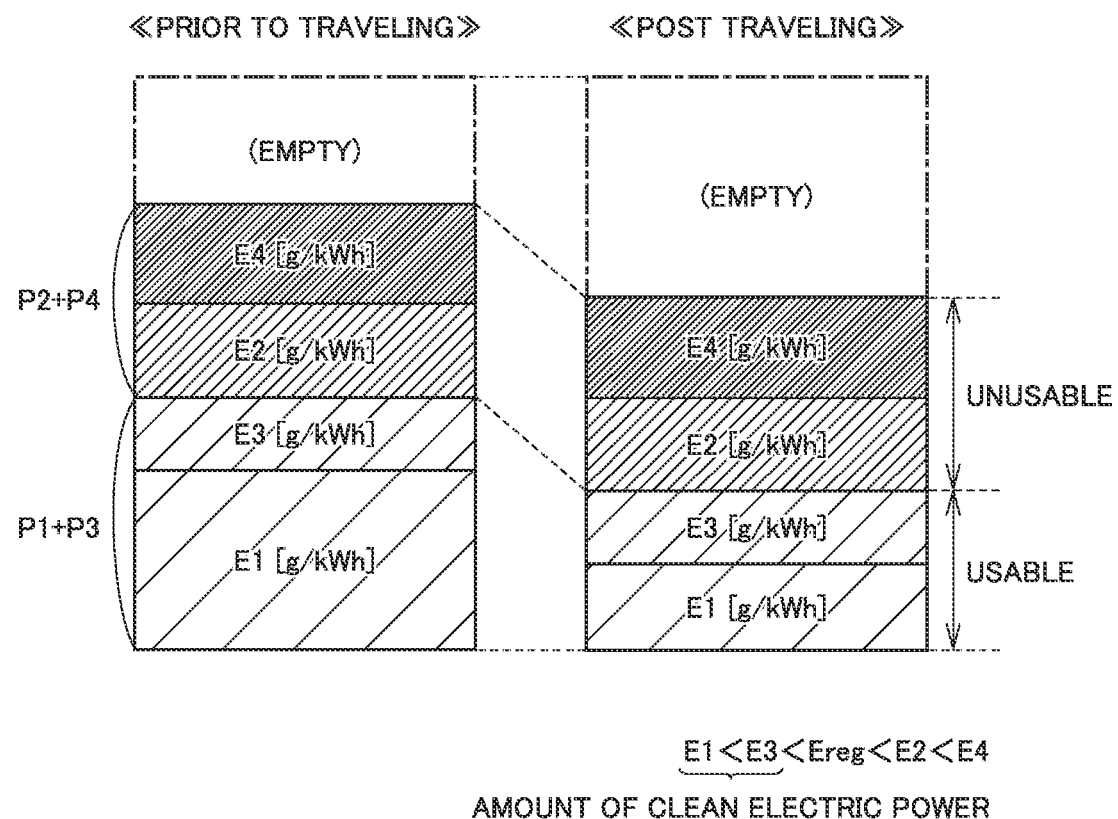
FIG. 6 is a diagram for illustrating a power coloring process according to Embodiment 1.

FIG. 6 is a conceptual diagram for illustrating the power coloring process according to Embodiment 1. In this example, the four charging opportunities, which are the first charging opportunity, the third charging opportunity, the second charging opportunity, the fourth charging opportunity, are listed in order starting from the smallest emission intensity to the largest emission intensity (E1<E3<E2<E4). A regulatory limit Ereg for the emission intensity at which the vehicle 1 is permitted to travel within a green zone is defined by laws and regulations or policies. Among the emission intensities E1 to E4 at the four charging opportunities, the emission intensities E1 and E3 at the first and third charging opportunities are less than the regulatory limit Ereg. Therefore, the amounts of electric powers P1 and P3 charged at the first and third charging opportunities are amounts of clean electric power. In contrast, the emission intensities E2 and E4 at the second and fourth charging opportunities are greater than the regulatory limit Ereg (E1<E3<Ereg<E2<E4). The amounts of electric power P2 and P4 charged at the second and fourth charging opportunities are not amounts of clean electric power.

The server 3 regards that the amounts of clean electric power charged to the battery 11 at the first and third charging opportunities are to be consumed if the vehicle 1 stays within the green zone. Accordingly, comparing before and after the vehicle 1 travels in the green zone, the amounts of clean electric power (P1+P3) charged to the battery 11 at the first and third charging opportunities are used and decrease, as shown in FIG. 6. The amounts of electric power (P2+P4) charged to the battery 11 at the second and fourth charging opportunities remain unused.

If the amounts of clean electric power (P1+P3) charged to the battery 11 at the first and third charging opportunities are greater than a reference amount Pref, the server 3 (the travel permission unit 309) permits the vehicle 1 to enter or travel within the green zone. In contrast, if the amounts of clean electric power (P1+P3) are less than or equal to the reference amount Pref, the server 3 does not permit (disallows) the entry of the vehicle 1 into the green zone.

Even though the amounts of clean electric power (P1+P3) are greater than the reference amount Pref at the time the vehicle 1 enters the green zone, if the amounts of clean electric power (P1+P3) are less than or equal to the reference amount Pref while the vehicle 1 is traveling within the green zone, the server 3 requests the vehicle 1 to promptly leave the green zone.

Referring, again, to FIG. 3, the EV-range calculation unit 305 calculates a distance (an EV range) the vehicle 1 can travel in the EV mode within the green zone. More specifically, as the EV range, the EV-range calculation unit 305 can calculate a distance that the vehicle 1 can travel, consuming the amounts of clean electric power (P1+P3 in the examples of FIGS. 5 and 6) within the amount of electric power stored in the battery 11. The power consumption efficiency of the vehicle 1 (a distance the vehicle 1 can travel per unit amount of electric power (unit: km/kWh), or an amount of electric power the vehicle 1 consumes to travel a unit distance (unit: kWh/km)) can be used for the calculation of the EV range. The power consumption efficiency of the vehicle 1 may be the actual value of the vehicle 1, or a catalogue value for the vehicle type of the vehicle 1.

The vehicle 1 is notified of the EV range calculated by the EV-range calculation unit 305 by a communication module (not shown), and the EV range is displayed on the HMI 12. The destination of notification of the EV range may be a mobile terminal (such as smartphone) of the user of the vehicle 1.

Alternative to or in addition to the EV range, if the EV range is longer than the reference range (if the amount of clean electric power is greater than the reference amount Pref), a message "traveling in green zone permitted" may be displayed on the HMI 12. In contrast, if the EV range is less than or equal to the reference range (if the amount of clean electric power is less than or equal to the reference amount Pref), a message "traveling in green zone not permitted" may be displayed on the HMI 12. This allows the user of the vehicle outside the green zone to previously know whether the entry of the vehicle 1 into the green zone is to be permitted. The user is also allowed to know how far the vehicle 1 can travel within the green zone. If the vehicle 1 already stays in the green zone, the user is allowed to know a remaining distance the vehicle 1 can travel within the green zone.

The vehicle location acquisition unit 306 obtains the location information (GPS the information) of the vehicle 1 from the vehicle 1. The obtained location information is output to the location determination unit 308.

The map storage unit 307 stores map information on a geographical region covered by the power management system 100. The geographical region covers at least one green zone. The map information is output to the location determination unit 308.

The location determination unit 308 compares the location information of the vehicle 1 with the map information, thereby determining whether the vehicle 1 is located inside or outside the green zone. The location determination unit 308 may also calculate a distance from the vehicle 1 to the boundary of the green zone, and determine that the vehicle 1 is approaching the green zone if the distance is below a predetermined value. A result of the determination by the location determination unit 308 is output to the travel permission unit 309.

When the vehicle 1 approaches the green zone or while the vehicle 1 is traveling within the green zone, the travel permission unit 309 determines whether to permit or not permit the vehicle 1 to travel (or continue to travel) within the green zone, based on a result of the power coloring process. Since this determination approach has been described with respect to FIGS. 5 and 6, the description will not be repeated here. The vehicle 1 is notified of whether the vehicle 1 is permitted/not permitted to travel within the green zone.

Preferably, the administrator (regulatory body) 8 of the green zone is also notified of whether the vehicle 1 is permitted/not permitted to travel in the green zone, together with the identification information (e.g., the number on the number plate) of the vehicle 1. This allows the administrator to crack down on or penalize the user of the vehicle 1 if the vehicle 1 is traveling within the green zone although the vehicle 1 is not permitted to do so.

<Electric Power Management Flow>

Figure 7:
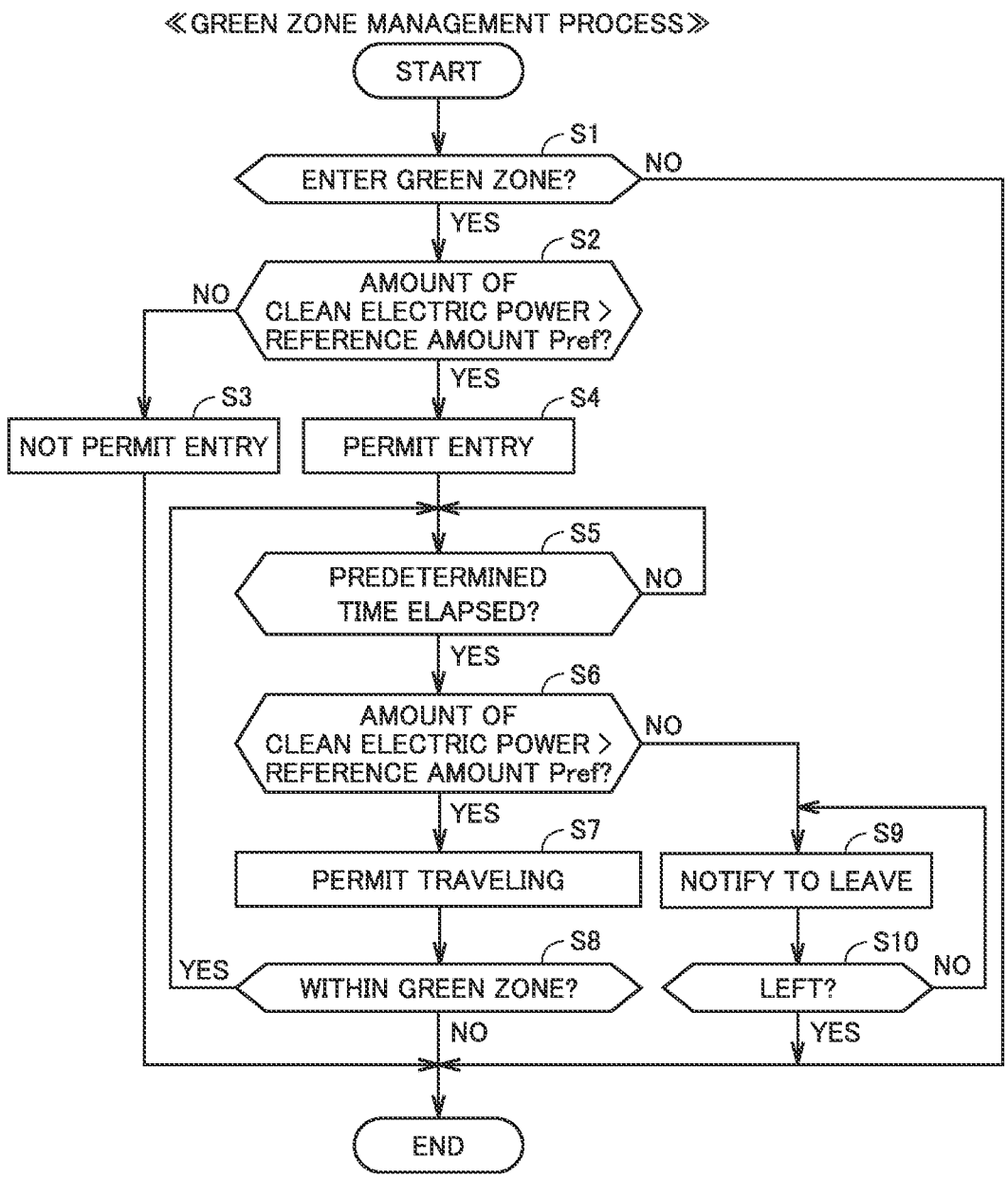
FIG. 7 is a flowchart illustrating a green zone management process.

FIG. 7 is a flowchart illustrating the green zone management process. The green zone management process is performed each time predetermined conditions are met or each time a predetermined time period elapses. Each process step described in FIG. 7 and respective flowcharts described later is implemented by software processing by the server 3. However, each process step may be implemented by hardware (an electric circuit) disposed in the server 3. Hereinafter, each process step is abbreviated as S. For ease of understanding, assume that the vehicle 1 is outside the green zone at the start of the process.

In S1, based on the location information of the vehicle 1 and the map information, the server 3 determines whether the vehicle 1 is approaching the green zone. If the vehicle 1 is distant from the green zone (NO in S1), the subsequent processes are skipped. If the vehicle 1 approaches the green zone (YES in S1), the server 3 passes the process to S2.

In S2, the server 3 determines whether the amount of electric power stored in the battery 11 includes the amount of clean electric power, having an emission intensity less than or equal to the regulatory limit Ereg, is greater than a predetermined reference amount Pref. The amount of clean electric power is calculated by the power coloring process described later. A most comprehensible example of the reference amount Pref is zero. However, the reference amount Pref may be a value greater than zero. The value can be determined based on, for example, the amount of electric power that is consumed by a typical vehicle when traveling a predetermined distance in the EV mode. If the amount of clean electric power is less than or equal to the reference amount Pref (NO in S2), the server 3 does not permit the entry of the vehicle 1 to the green zone (S3). In contrast, if the amount of clean electric power is greater than the reference amount Pref (YES in S2), the server 3 permits the entry of the vehicle 1 to the green zone (S4). Assume that this results in the vehicle 1 having entered the green zone.

In S5, the server 3 determines whether a predetermine time (e.g., a few seconds to a few minutes) has elapsed since the previous execution of the process steps of S5 to S8. If the predetermine time has elapsed (YES in S5), the server 3 passes the process to S6.

In S6, the server 3 determines whether the amount of electric power stored in the battery 11 includes an amount of clean electric power greater than the reference amount Pref. The reference amount Pref presented in the process step of S2 and the reference amount Pref presented in the process step of S6 may be the same, or different values may be set. More specifically, since the amount of clean electric power gradually decreases as the vehicle 1 travels, if the amount of clean electric power is not sufficient at a moment the vehicle 1 enters the green zone, the amount of clean electric power is highly likely to be depleted while the vehicle 1 is staying in the green zone. Accordingly, the reference amount Pref presented in the process step of S2 may be a value within a certain margin relative to the reference amount Pref in the process step of S6.

If the amount of clean electric power is greater than the reference amount Pref (YES in S6), the server 3 permits the vehicle 1 to travel within the green zone (S7). Then, the server 3 determines whether the vehicle 1 is still staying within the green zone (S8). If the vehicle 1 is staying in the green zone (YES in S8), the server 3 returns the process to S5. This repeats the process steps of S5 to S8 while the vehicle 1 is staying within the green zone. If the vehicle 1 leaves the green zone (NO in S8), the server 3 ends the series of process steps.

In S6, if the amount of clean electric power is less than or equal to the reference amount Pref (NO in S6), the server 3 notifies the vehicle 1 that the vehicle 1 should leave the green zone (S9). The server 3 may send the vehicle 1 a warning prompting the vehicle 1 to leave the green zone. If the vehicle 1 having received a notice or a warning does not leave the green zone promptly (NO in S10), the server 3 may repeat a notice or a warning.

Although not shown, if a prescribed period of time (e.g., a few hours) has elapsed, without the vehicle 1 leaving the green zone, the server 3 may transmit the identification information and the location information of the vehicle 1 to the administrator 8 of the green zone. This allows the administrator 8 to identify the vehicle 1 and strongly warn or impose a penalty, such as a fine, on the user of the vehicle 1. If the vehicle 1 leaves the green zone (YES in S10), the server 3 ends the series of process steps.

Figure 8:
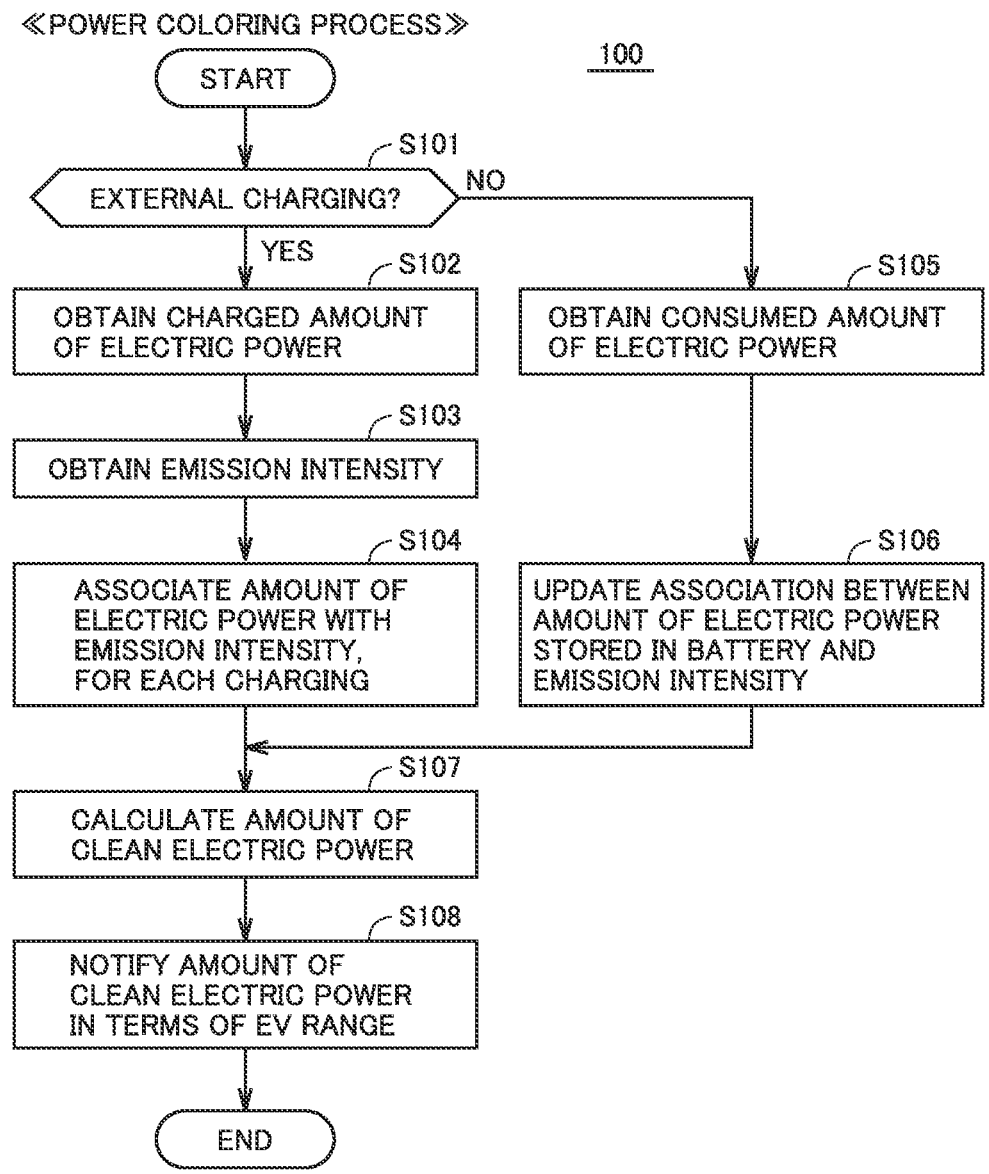
FIG. 8 is a flowchart illustrating the power coloring process according to Embodiment 1.

FIG. 8 is a flowchart illustrating the power coloring process according to Embodiment 1. The power coloring process is repeatedly performed at predetermined intervals.

In S101, the server 3 determines whether the vehicle 1 has performed external charging at the electric vehicle supply equipment 2. If the vehicle 1 has performed external charging (YES in S101), the server 3 obtains the amount of electric power charged from the electric vehicle supply equipment 2 to the vehicle 1, through communications with the electric vehicle supply equipment 2 (or the vehicle 1) (S102). Regarding the amount of electric power supplied from the power system 4 to the electric vehicle supply equipment 2, the server 3 further obtains, through communications with the operator server 6, the data related to the emission intensity of that amount of electric power when generated (S103).

In S104, the server 3 associates the amount of electric power obtained in S101 and the emission intensity obtained in S102 for each external charging opportunity of the vehicle 1, and stores the association into the memory 32. This allows the server 3 to distinctly manage the association between the amount of electric power charged to the battery 11 and the emission intensity for each external charging opportunity.

In contrast, if the vehicle 1 does not perform external charging (NO in S101), that is, if the vehicle 1 is in a condition in which the amount of electric power stored in the battery 11 is being consumed, such as a condition in which the vehicle 1 is traveling, the server 3 obtains from the vehicle 1 the amount of electric power consumed from the amount of electric power stored in the battery 11 (S105).

In S106, according to a predetermined computation approach, the server 3 subtracts the amount of electric power obtained in S105 from the amount of electric power stored in the battery 11, thereby updating the association between the amount of electric power stored in the battery 11 and the emission intensity. This computation approach is not particularly limited. Various approaches can be adopted. For example, in the example shown in FIG. 6, the consumed amount of electric power is withdrawn from P3 having a greater emission intensity among the amounts of clean electric power (P1+P3) before the vehicle 1 travels in the green zone. However, the consumed amount of electric power may be withdrawn from P3 having a less emission intensity. Alternatively, the consumed amount of electric power may be withdrawn from the amount of clean electric power (P1+P3) while keeping the ratio of P1 to P3. After the execution of the process step S104 or S106, the process proceeds to S107.

In S107, the server 3 calculates the most-recent value of the amount of clean electric power within the amount of electric power stored in the battery 11. Then, the server 3 notifies the vehicle 1 of the most-recent value of the amount of clean electric power in terms of EV range of the vehicle 1 (S108). However, the server 3 may notify the vehicle 1 of the amount of clean electric power as is.

As described above, in Embodiment 1, the server 3 performs the power coloring process on the amount of electric power stored in the battery 11, and associates the amount of electric power stored in the battery 11 with emission intensities. This allows the server 3 to know how much clean electric power is included in the amount of electric power stored in the battery 11. Thus, according to Embodiment 1, the server 3 can appropriately determine whether the vehicle 1 can be permitted to travel in the green zone.

Note that FIGS. 7 and 8 have been described with reference to the server 3 performing all the steps. However, the steps may be performed by the ECU 13 of the vehicle 1. Alternatively, the steps may be divided between the server 3 and the ECU 13. In other words, the server 3 may perform some of the steps and the ECU 13 may perform the rest.

[Variation of Embodiment 1]

Figure 9:
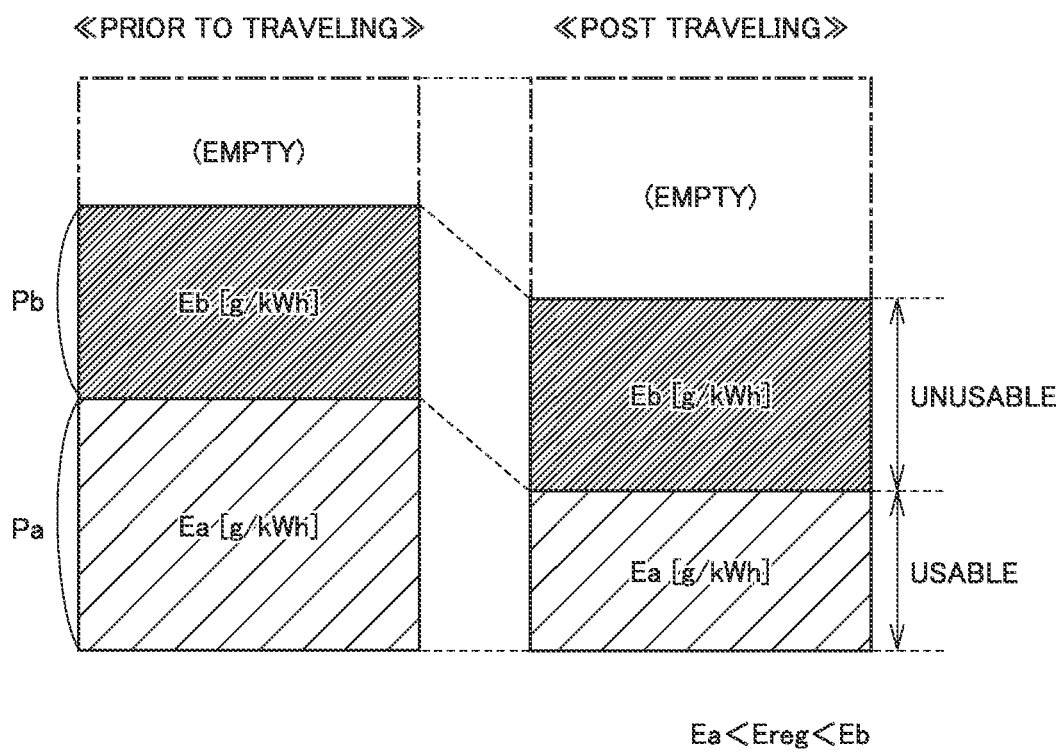
FIG. 9 is a diagram for illustrating power coloring according to Variation of Embodiment 1.

FIG. 9 is a diagram for illustrating the power coloring according to Variation of Embodiment 1 Embodiment 1 has been described with reference to managing the association between the amount of electric power stored in the battery 11 and the emission intensity for each external charging opportunity (see FIG. 6). According to Variation of Embodiment 1, in contrast, the unit of management is broadened and the amount of electric power stored in the battery 11 is managed based on whether the emission intensity is greater than the regulatory limit Ereg. Describing an emission intensity less than or equal to the regulatory limit Ereg as Ea, and an emission intensity greater than the regulatory limit Ereg as Eb, the amount of electric power stored in the battery 11 is managed based on whether the emission intensity is Ea or Eb.

Using the example described with respect to FIG. 6, more specific description is given. Four charging opportunities are present, in which the first and third charging opportunities have the emission intensities E1 and E3 less than the regulatory limit Ereg, while the second and fourth charging opportunities have the emission intensities E2 and E4 greater than the regulatory limit Ereg (E1<E3<Ereg<E2<E4). In this case, the amount of electric power charged to the battery 11 at the first charging opportunity and the amount of electric power charged to the battery 11 at the third charging opportunity are collectively managed as an amount of electric power having the emission intensity Ea. The amount of electric power charged to the battery 11 at the second charging opportunity and the amount of electric power charged to the battery 11 at the fourth charging opportunity are collectively managed as an amount of electric power having the emission intensity Eb.

The server 3 permits the vehicle 1 to travel within the green zone using the amount of electric power having the emission intensity Ea, while does not permit to travel using the amount of electric power having the emission intensity Eb.

Figure 10:
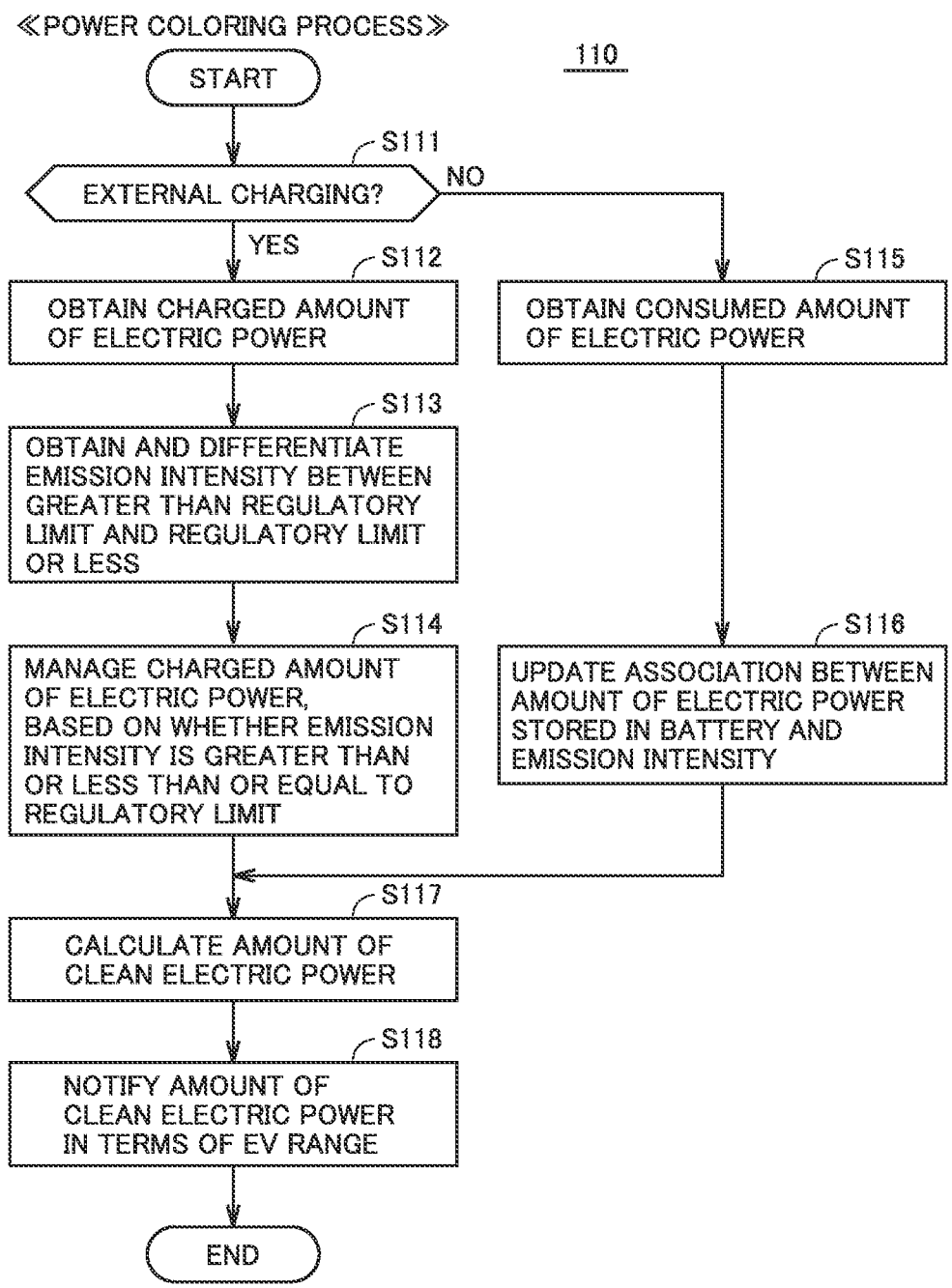
FIG. 10 is a flowchart illustrating a power coloring process according to Variation of Embodiment 1.

FIG. 10 is a flowchart illustrating the power coloring process according to Variation of Embodiment 1. If the vehicle 1 performs external charging (YES in S111), the server 3 obtains the amount of electric power charged from the electric vehicle supply equipment 2 to the vehicle 1, through communications with the electric vehicle supply equipment 2 (S112).

In S113, regarding the amount of electric power supplied from the power system 4 to the electric vehicle supply equipment 2, the server 3 obtains, through communications with the operator server 6, the data related to the emission intensity of that electric power when generated. If the obtained emission intensity is greater than the regulatory limit Ereg, the server 3 then assigns the amount of electric power with the emission intensity Eb. If the obtained emission intensity is less than or equal to the regulatory limit Ereg, the server 3 assigns the amount of electric power with the emission intensity Ea.

In S114, the server 3 associates the amount of electric power obtained in S112 and the emission intensity Ea or Eb assigned in S113, and stores its association into the memory 32. This allows the server 3 to distinctly manage the amount of electric power charged to the battery 11 based on whether it corresponds to Ea or Eb. The remaining process steps S115 to S118 are the same as the process steps of S105 to S108 according to Embodiment 1 (see FIG. 8), and the description thereof will thus not be repeated.

As described above, in Variation of Embodiment 1, the server 3 manages the association of the amount of electric power stored in the battery 11 and the emission intensity simply based on whether the emission intensity is greater than or less than or equal to the regulatory limit Ereg. This can reduce the complexity of the management, as compared to Embodiment 1 in which the association above is distinctly managed for each external charging opportunity of the vehicle 1.

Embodiment 2

Embodiments 2 and 3 will be described with respect to various variations of the power coloring process. The power management system according to Embodiments 2 and 3 each have an overall configuration similar to the configuration shown in FIG. 1. The green zone management process in the power management methods according to Embodiments 2 and 3 are also similar to those illustrated in FIG. 7. Thus, detailed description will not be repeated.

Figure 11:
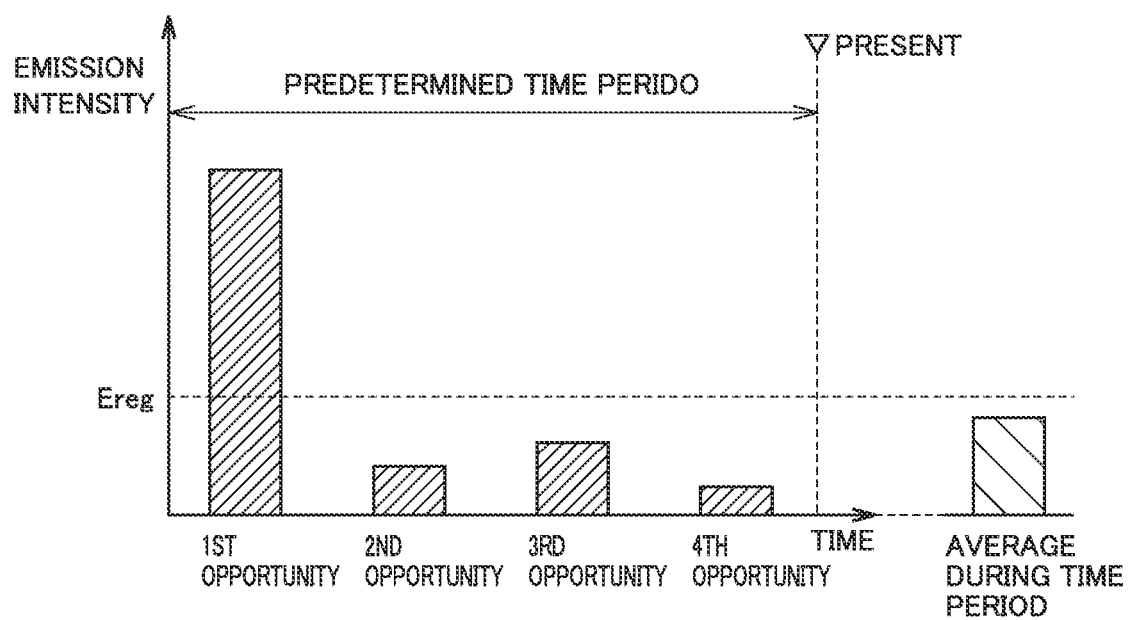
FIG. 11 is a conceptual diagram for illustrating a power coloring process according to Embodiment 2.

FIG. 11 is a conceptual diagram for illustrating a power coloring process according to Embodiment 2. In Embodiment 2, an average emission intensity of the amounts of electric power charged to the battery 11 over a predetermined period (a month, half a year, a year, etc.) is calculated.

FIG. 11 shows an example in which external charging is performed four times in the predetermined period. In this example, the emission intensity of the amount of electric power charged to the first charging opportunity is greater than the regulatory limit Ereg, while the emission intensities of the amounts of electric power charged at the second to the fourth charging opportunities are less than the regulatory limit Ereg. As a result, an average of the four emission intensities is less than the regulatory limit Ereg.

Associating the average emission intensity in the predetermined period with the amount of electric power in such a manner, even if the emission intensity at a certain charging opportunity (in this example, the first charging opportunity) is greater than the regulatory limit Ereg, the average emission intensity can be reduced less than the regulatory limit Ereg by using the other opportunities (the second to the fourth opportunities) in the predetermined period. Stated differently, an unduly rise in emission intensity can be made up for by using the other opportunities. Accordingly, in order to prevent a situation in which the vehicle 1 is unable to travel in the green zone, the user can be provided, at an external charging opportunity, with motivation to select the electric vehicle supply equipment 2 that allows charging of the amount of electric power having the emission intensity less than or equal to the regulatory limit Ereg. Thus, reduction of greenhouse gas emission is facilitated.

Figure 12:
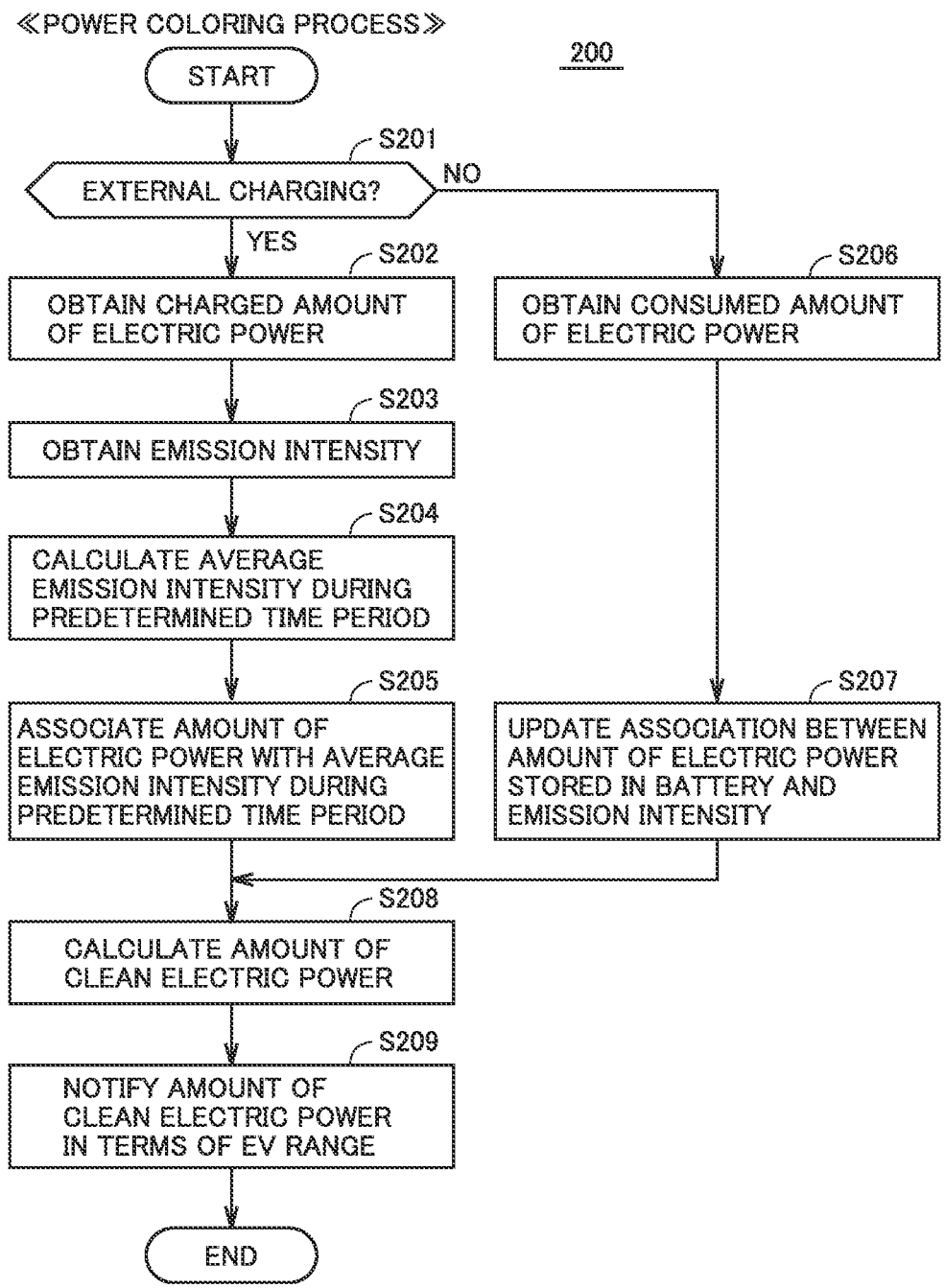
FIG. 12 is a flowchart illustrating the power coloring process according to Embodiment 2.

FIG. 12 is a flowchart illustrating the power coloring process according to Embodiment 2. If the vehicle 1 performs external charging (YES in S201), the server 3 obtains the amount of electric power charged from the electric vehicle supply equipment 2 to the vehicle 1, through communications with the electric vehicle supply equipment 2 (S202).

In S203, regarding the amount of electric power supplied from the power system 4 to the electric vehicle supply equipment 2, the server 3 obtains, through communications with the operator server 6, the data related to the emission intensity of that electric power when generated. The server 3 then calculates an average emission intensity of the amounts of electric power charged to the battery 11 in the predetermined period (S205). Specifically, for example, the mathematical formula: $E_{ave}=(E_0 \times P_0 + E \times P)/(P_0+P)$ can be used to calculate an average emission intensity $E_{ave}$, where $P_0$ [kWh] indicates an amount of electric power originally charged to the battery 11, and $E_0$ [g/kWh] indicates an average emission intensity of that amount of electric power. P [kWh] indicates an amount of electric power charged to the battery 11 this time and E [g/kWh] indicates the emission intensity of that amount of electric power.

In S205, the server 3 stores into the memory 32 the association between the amount of electric power stored in the battery 11 and the average emission intensity calculated in S204. This allows the server 3 to associate the amount of electric power stored in the battery 11 of the vehicle 1 with the emission intensity.

Although not shown, for later use for the calculation of average emission intensity, the association of the amount of electric power obtained in S201 and the emission intensity obtained in S203 is also stored in the memory 32, together with the time of performance of the external charging of the vehicle 1. The remaining process steps S206 to S209 are the same as the process steps of S105 to S108 according to Embodiment 1 (see FIG. 8), and the description thereof will thus not be repeated.

As described above, similarly to Embodiment 1, even in Embodiment 2, the server 3 performs the power coloring process on the amount of electric power stored in the battery 11, and associates the amount of electric power stored in the battery 11 with the emission intensity. This allows the server 3 to know how much clean electric power is within the amount of eclectic power stored in the battery 11, thereby allowing the server 3 to appropriately determine whether to permit the vehicle 1 to travel within the green zone.

Furthermore, in Embodiment 2, the average emission intensity in the predetermined period is associated with the amount of electric power. This allows, even if the emission intensity is temporally greater than the regulatory limit Ereg, the average emission intensity to be reduced less than or equal to the regulatory limit Ereg, using the later charging opportunities, as described with respect to FIG. 11. Conversely, for example, even if the emission intensity is low in the first half of the predetermined period, the average emission intensity may exceed the regulatory limit Ereg if an amount of electric power having a high emission intensity is repeatedly charged in the latter half of the predetermined period. Accordingly, the user is provided with motivation to select an amount of electric power having a low emission intensity as possible as he/she can even in the latter half of the predetermined period. Thus, according to Embodiment 2, reduction of greenhouse gas emission is effectively facilitated.

Embodiment 3

An electric vehicle supply equipment 2, from which the amount of electric power having an emission intensity less than a regulatory limit Ereg can be charged to the vehicle 1, may not exist in the user's residential area (e.g., areas nearby home or workplace, etc.). Alternatively, depending on the user's residential area, there may be only an option for electric vehicle supply equipment 2 that allows charging of an amount of electric power having not data related to the emission intensity attached thereto. Such circumstances forces the user to go to an electric vehicle supply equipment 2 in a distant area if a server 3 requests the user to perform external charging with an amount of electric power having an emission intensity less than the regulatory limit Ereg. This can significantly deteriorate the user convenience.

Figure 13:
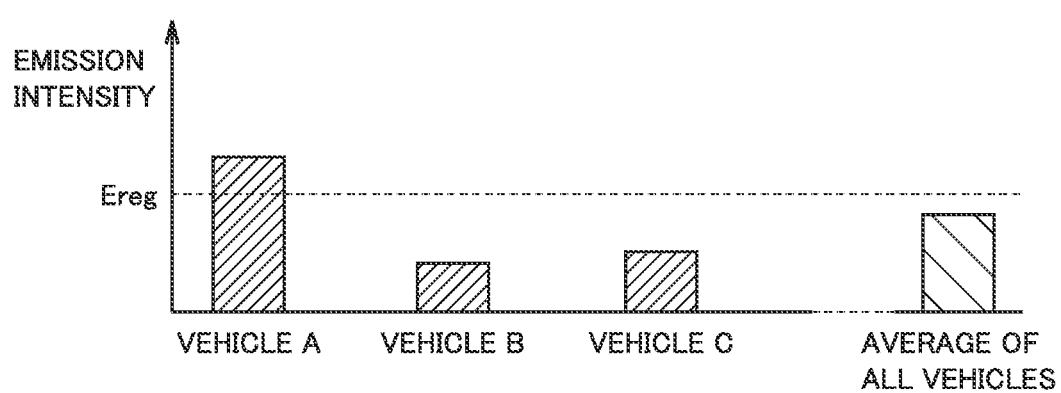
FIG. 13 is a conceptual diagram for illustrating a power coloring process according to Embodiment 3.

FIG. 13 is a conceptual diagram for illustrating a power coloring process according to Embodiment 3. In Embodiment 3, the server 3 calculates an average emission intensity of the vehicles that are served by an organization (which may be a group or a community) to which the vehicle 1 (or the user of the vehicle 1) belong to. If a company (e.g., courier) owns the vehicles, including the vehicle 1, the company may be the "organization." More specifically, if the vehicle 1 is a rental car, a taxi, or a shared car, the operating company may be the organization. Alternatively, if the user privately owns the vehicle 1, the company (a car manufacturer) that manufactured the vehicle 1 may be the organization. A municipality of the user's residential area may also be the organization.

FIG. 13 shows an example in which an average emission intensity of three vehicles A to C owned by the organization is calculated. In this example, the emission intensity of the amount of electric power charged to the vehicle A is greater than the regulatory limit Ereg, while the emission intensities of the amounts of electric power charged to the vehicles B and C are less than the regulatory limit Ereg. As a result, the average emission intensity of the vehicle A to C, as a whole, is less than the regulatory limit Ereg.

Associating the average emission intensity of the vehicles with the amounts of electric power in such a manner, even if the emission intensities of amounts of electric power charged to some of the vehicles of the organization are greater than the regulatory limit Ereg, the remaining vehicles can lower the average emission intensity less than the regulatory limit Ereg. Stated differently, the emission intensities can be made up for between the vehicles (or between users) in the organization. Accordingly, the entry of the organization is provided with motivation to select amounts of electric power having emission intensities less than or equal to the regulatory limit Ereg, while reducing the deterioration in convenience for some users. Thus, reduction of greenhouse gas emission is facilitated.

FIG. 14 is a flowchart illustrating a power coloring process according to Embodiment 3 If the vehicle 1 performs external charging (YES in S301), the server 3 obtains the amount of electric power charged from the electric vehicle supply equipment 2 to the vehicle 1, through communications with the electric vehicle supply equipment 2 (S302).

In S303, regarding the amount of electric power, supplied from the power system 4 to the electric vehicle supply equipment 2, the server 3 obtains, through communications with the operator server 6, the data related to the emission intensity of that amount of electric power when generated. The server 3 then calculates an average emission intensity of the amounts of electric power charged to the batteries 11 of the vehicles that are served by the organization (S304). Specifically, for three vehicles A, B, and C as shown in FIG. 13 for example, the mathematical formula: $E_{ave}=(E_A \times P_A + E_B \times P_B + E_C \times P_C)/(P_A + P_B + P_C)$ can be used to calculate an average emission intensity Eave. The amount of electric power P and the emission intensity E are differentiated for each vehicle by subscripts A to C.

In S305, the server 3 stores in the memory 32 the association of the amount of electric power stored in the battery 11 and the average emission intensity, calculated in S304, for all the vehicles served by the organization. This allows the server 3 to associates the amount of electric power stored in the battery 11 of target vehicles with their emission intensities.

As described above, even in Embodiment 3, the server 3 performs the power coloring process on the amount of electric power stored in the battery 11, and associates the amount of electric power stored in the battery 11 with the emission intensity, similarly to Embodiment 1. This allows the server 3 to know how much clean electric power is within the amount of electric power stored in the battery 11, thereby appropriately determining whether to permit the vehicle 1 to travel within the green zone.

Furthermore, in Embodiment 3, the amount of electric power is associated with an average emission intensity of the vehicles served by the organization. This allows an amount of electric power having a low emission intensity to be supplied between the vehicles or between the users. Accordingly, the organization is provided with motivation to select an amount of electric power having as low an emission intensity as possible, while preventing a situation where the convenience for some users is deteriorated. Thus, according to Embodiment 3, the reduction of greenhouse gas emission is effectively facilitated.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A system for managing electric power information, the system comprising:
   a vehicle including a power storage device that is charged with electric power supplied from a charging facility, and
   a server, wherein
   a travel restriction zone exists in which traveling using an amount of electric power having a greenhouse gas emission intensity greater than a regulatory limit is restricted, the server includes:
- an interface that obtains the emission intensity of electric power supplied from the charging facility; and
- a processor that associates the amount of electric power charged from the charging facility to the power storage device with the emission intensity obtained via the interface, wherein the processor:
  - permits the vehicle to travel within the travel restriction zone using an amount of electric power having the emission intensity less than the regulatory limit within an amount of electric power stored in the power storage device,
  - notifies the vehicle of information related to the amount of electric power having the emission intensity less than the regulatory limit, and
  - controls the vehicle to use an amount of electric power having the emission intensity less than the regulatory limit when the vehicle travels within the travel restriction zone.

2. The system according to claim 1, wherein the processor:
- differentiates association between the amount of electric power charged from the charging facility to the power storage device and the emission intensity for each charging opportunity of the power storage device, and
- notifies the vehicle of information related to a sum of the amount of electric power having the emission intensity less than the regulatory limit.

3. The system according to claim 1, wherein the processor:
- differentiates the amount of electric power charged from the charging facility to the power storage device based on whether the emission intensity is greater than the regulatory limit or less than the regulatory limit; and
- notifies the vehicle of information related to the amount of electric power having the emission intensity less than the regulatory limit.

4. The system according to claim 1, wherein the processor:
- calculates an average, in a predetermined period, of the emission intensity associated with the amount of electric power charged from the charging facility to the power storage device, and
- notifies the vehicle of information related to the amount of electric power having the emission intensity whose average is less than the regulatory limit.

5. The system according to claim 1, wherein the system further includes:
- a plurality of vehicles, including the vehicle; and
- the processor:
  - calculates an average of emission intensities associated with amounts of electric power charged from the charging facility to power storage devices of the vehicle and the plurality of vehicles; and
  - notifies the vehicle of information related to the amount of electric power having the emission intensity whose average is less than the regulatory limit.

6. The system according to claim 1, wherein
prior to the vehicle traveling within the travel restriction zone, the processor notifies the vehicle of a distance that the vehicle can travel within the travel restriction zone, the distance being calculated based on the amount of electric power having the emission intensity less than the regulatory limit.

7. The system according to claim 6, wherein
when the vehicle is traveling within the travel restriction zone, the processor updates the distance that the vehicle can travel within the travel restriction zone and notifies the vehicle of the updated distance.

8. The system according to claim 1, wherein
the processor further notifies an administrator of the travel restriction zone of information related to the amount of electric power having the emission intensity less than the regulatory limit.

9. The system according to claim 1, wherein,
the processor does not permit the vehicle to travel within the travel restriction zone any further if the amount of electric power having the emission intensity less than the regulatory limit is consumed and depleted along with the vehicle traveling within the travel restriction zone.

10. A method for managing electric power information of a vehicle, wherein
the vehicle includes a power storage device that is charged with electric power supplied from a charging facility, and
a travel restriction zone exists in which traveling using an amount of electric power having a greenhouse gas emission intensity greater than regulatory limit is restricted,
the method comprising:
- obtaining, by a server, the amount of electric power charged from the charging facility to the power storage device;
- obtaining, by the server, the emission intensity of the electric power supplied from the charging facility;
- associating, by the server, the amount of electric power charged from the charging facility to the power storage device with the emission intensity;
- permitting, by the server, the vehicle to travel within the travel restriction zone using an amount of electric power having the emission intensity less than the regulatory limit within an amount of electric power stored in the power storage device;
- notifying, by the server, the vehicle of information related to the amount of electric power having the emission intensity less than the regulatory limit; and
- controlling, by the server, the vehicle to use an amount of electric power having the emission intensity less than the regulatory limit when the vehicle travels within the travel restriction zone.

11. The method according to claim 10, the method further comprising:
- not permitting, by the server, the vehicle to travel within the travel restriction zone any further if the amount of electric power having the emission intensity less than the regulatory limit is consumed and depleted along with the vehicle traveling within the travel restriction zone.

* * * * *